US012478432B2

(12) United States Patent
Käseberg et al.

(10) Patent No.: US 12,478,432 B2
(45) Date of Patent: Nov. 25, 2025

(54) TECHNIQUE FOR PROVIDING GUIDANCE TO A USER ON WHERE TO ARRANGE AN OBJECT OF INTEREST IN AN OPERATING ROOM

(71) Applicant: Stryker European Operations Limited, Carrigtwohill (IE)

(72) Inventors: Marc Käseberg, Biesenthal (DE); Markus Finke, Berlin (DE); Christian Winne, Berlin (DE)

(73) Assignee: Stryker European Operations Limited, Carrigtwohill (IE)

( * ) Notice: Subject to any disclaimer, the term of this patent is extended or adjusted under 35 U.S.C. 154(b) by 186 days.

(21) Appl. No.: 17/968,322

(22) Filed: Oct. 18, 2022

(65) Prior Publication Data

US 2023/0127963 A1     Apr. 27, 2023

(30) Foreign Application Priority Data

Oct. 22, 2021   (EP) .................................... 21204300

(51) Int. Cl.
*A61B 34/10*     (2016.01)
*G02B 27/01*     (2006.01)
*G16H 40/60*     (2018.01)

(52) U.S. Cl.
CPC ............ *A61B 34/10* (2016.02); *G02B 27/017* (2013.01); *G16H 40/60* (2018.01); *A61B 2034/107* (2016.02)

(58) Field of Classification Search
None
See application file for complete search history.

(56) References Cited

U.S. PATENT DOCUMENTS 9,652,591 B2    5/2017   Moctezuma de la Barrera et al.
10,846,851 B2   11/2020  Boettger et al.
(Continued)

FOREIGN PATENT DOCUMENTS

CN    108784832 A    11/2018
CN    109758230 A    5/2019
(Continued)

OTHER PUBLICATIONS

English language abstract and machine-assisted English translation for CN 108784832 A extracted from espacenet.com database on Jan. 26, 2023, 10 pages.
(Continued)

*Primary Examiner* — Shahdeep Mohammed
(74) *Attorney, Agent, or Firm* — Howard & Howard Attorneys PLLC

(57) ABSTRACT

Disclosed is a method for providing guidance to a user on where to arrange an object of interest in an operating room. The method includes obtaining a spatial pose of an item arranged within the operating room and obtaining a requirement on a spatial relationship between an object of interest and the item. The method also includes determining (a) a first spatial portion in which the object of interest is recommended to be arranged, the first spatial portion being larger than the object of interest, and/or (b) a second spatial portion in which the object of interest is not allowed to be arranged. Moreover, the method includes triggering display of a visualization of the first and/or second spatial portion to guide a user on where to arrange the first object of interest in the operating room.

27 Claims, 9 Drawing Sheets

(56) References Cited

U.S. PATENT DOCUMENTS

| | | | |
|---|---|---|---|
| 2016/0379504 | A1 | 12/2016 | Bailey et al. |
| 2019/0046276 | A1 | 2/2019 | Inglese et al. |
| 2019/0183576 | A1 | 6/2019 | Fahim et al. |
| 2019/0228859 | A1 | 7/2019 | Moctezuma de la Barrera |
| 2019/0321115 | A1* | 10/2019 | Anderson .......... A61B 17/3423 |
| 2021/0228282 | A1 | 7/2021 | Dimaio et al. |
| 2021/0244479 | A1* | 8/2021 | Wassall .............. G02B 27/0172 |

FOREIGN PATENT DOCUMENTS

| | | |
|---|---|---|
| DE | 102015226669 A1 | 6/2017 |
| EP | 3861957 A1 | 8/2021 |
| WO | 2015164402 A1 | 10/2015 |
| WO | 2020163358 A1 | 8/2020 |

OTHER PUBLICATIONS

English language abstract and machine-assisted English translation for CN 109758230 A extracted from espacenet.com database on Jan. 26, 2023, 14 pages.

English language abstract for DE 10 2015 226 669 A1 extracted from espacenet.com database on Jan. 26, 2023, 2 pages.

* cited by examiner

TECHNIQUE FOR PROVIDING GUIDANCE TO A USER ON WHERE TO ARRANGE AN OBJECT OF INTEREST IN AN OPERATING ROOM

PRIORITY CLAIM

This application claims priority under 35 U.S.C. § 119 to European Patent Application No. 21204300.4, filed Oct. 22, 2021, the entire contents of which are hereby incorporated by reference.

TECHNICAL FIELD

The present disclosure generally relates to a computer-implemented method for providing guidance to a user on where to arrange an object of interest in an operating room. The disclosure also relates to a processing system and a computer program.

BACKGROUND

In clinical environments, various medical devices may be positioned in different poses in an operating room. Such devices include instrument trays, medical monitoring equipment such as electroencephalographs or electrocardiographs, tracking equipment (e.g., a stereo camera of an optical tracking system, an electric field generator of an electromagnetic tracking system, tracking markers such as an active or passive optical marker detectable by optical tracking system, and a sensor configured to detect an electromagnetic field emitted by the electric field generator), and an operating table.

Currently, user manuals of the medical devices usually contain setup information on where and how (e.g., in which orientation) to arrange the respective medical device in an operating room. Users therefore need to study all user manuals and remember the setup information for each medical device.

When arranging many medical devices in the operating room, mistakes may arise from an erroneous recollection of the setup information by a user. As a result, medical devices may be set up in wrong poses in the operating room. Correcting such wrong poses may take additional time. Even more significantly, some medical staff such as a surgeon may not be immediately aware of the wrong poses, and may commence surgery with one or more medical devices not properly arranged in the operating room. This may impede the surgical procedure and has the potential to negatively affect clinical outcome.

The above problems do not only arise when placing medical devices in an operating room, but similarly apply to other items and objects to be arranged within the operating room. For instance, a patient should be positioned in a certain pose in the operating room. This pose may depend on the surgical procedure the patient is to undergo.

SUMMARY

There is a need for a technique that solves one or more of the aforementioned or other problems.

According to a first aspect, a computer-implemented method for providing guidance to a user on where to arrange an object of interest in an operating room is provided. The method comprises obtaining scene data indicative of a spatial pose of at least one item arranged within the operating room, obtaining first constraint data indicative of one or more requirements on a spatial relationship between a first object of interest and the at least one item arranged within the operating room, and determining, based on the scene data and the first constraint data, at least one primary spatial portion chosen from (a) a first spatial portion in which the first object of interest is recommended to be arranged, the first spatial portion being larger than the first object of interest, and (b) a second spatial portion in which the first object of interest is not allowed to be arranged. The method further comprises triggering display of a visualization of the at least one primary spatial portion to guide a user on where to arrange the first object of interest in the operating room.

The first spatial portion may be a two-dimensional area or a three-dimensional volume. The same applies to the second, third and fourth spatial portions described herein. The term "portion" may also be understood as "section" or "segment". The at least one primary spatial portion may comprise only the first spatial portion, or may comprise only the second spatial portion. The at least one primary spatial portion may comprise both the first spatial portion and the second spatial portion.

The first spatial portion may comprise at least two first sub-portions, each first sub-portion comprising at least one recommended position or pose (i.e., at least one of a position and an orientation) of the first object of interest. Each of the first sub-portions may be associated with a different degree of recommendation. The visualization of the first spatial portion may comprise a distinguishable visualization of each first sub-portion. The sub-portions described herein may have the same dimensionality as the respective spatial portions (e.g., the sub-portions of a two-dimensional first spatial portion may also be two-dimensional and the sub-portions of a three-dimensional first spatial portion may also be three-dimensional).

The method may further comprise obtaining, for each of at least one second object of interest, second constraint data. The second constraint data may be indicative of one or more requirements on a spatial relationship between the second object of interest and the first object of interest. The method may further comprise determining, for each of the at least one second object of interest, based on the determined primary spatial portion and the second constraint data, at least one secondary spatial portion chosen from (a) a third spatial portion in which the second object of interest is recommended to be arranged, and (b) a fourth spatial portion in which the second object of interest is not allowed to be arranged. The method may further comprise triggering, for each of the at least one second object of interest, display of a visualization of the at least one secondary spatial portion to guide a user on where to arrange the at least one second object of interest in the operating room.

The third spatial portion may be larger than the second object of interest.

The third spatial portion may comprise at least two third sub-portions. Each third sub-portion may comprise at least one recommended position of the second object of interest. Each of the third sub-portions may be associated with a different degree of recommendation. The visualization of the third spatial portion may comprise a distinguishable visualization of each third sub-portion.

The method may further comprise obtaining first alignment data indicative of a spatial relationship between the first object of interest arranged in the operating room and the at least one item. The method may further comprise determining, for each of the at least one second object of interest, an updated instance of the at least one secondary spatial portion based on the second constraint data and the first alignment data. The method may further comprise updating, for each of the at least one second object of interest, the display of the visualization of the at least one secondary spatial portion based on the updated instance of the at least one secondary spatial portion.

The updated instance of the at least one secondary spatial portion may be determined responsive to (e.g., in response to or triggered by) the first alignment data indicating that the first object of interest is arranged within the first spatial portion.

The method may further comprise, responsive to the first alignment data indicating that the first object of interest is arranged within the first spatial portion, triggering display of an instruction to arrange one or more of the at least one second object of interest in the third spatial portion determined for the one or more of the at least one second object of interest.

The method may further comprise obtaining second alignment data indicative of a spatial relationship between the at least one primary spatial portion and one or more of the at least one second object of interest arranged in the operating room. The method may further comprise determining an updated instance of the at least one primary spatial portion based on the second constraint data and the second alignment data. The method may further comprise updating the display of the visualization of the at least one primary spatial portion based on the updated instance of the at least one primary spatial portion.

The updated instance of the at least one primary spatial portion may be determined responsive to the second alignment data indicating that the one or more of the at least one second object of interest are arranged within the third spatial portion determined for the one or more of the at least one second object of interest.

The method may further comprise obtaining, for one of the at least one second object of interest, third constraint data. The third constraint data may be indicative of one or more requirements on a spatial relationship between the one of the at least one second object of interest and another one or more of the at least one second object of interest. The at least one secondary spatial portion of the one of the at least one second object of interest may be determined further based on the third constraint data.

The method may further comprise obtaining third alignment data indicative of a spatial relationship between (i) the at least one secondary spatial portion of the one of the at least one second object of interest and (ii) the another one or more of the at least one second object of interest arranged in the operating room. The method may further comprise determining, based on the third constraint data and the third alignment data, an updated instance of the at least one secondary spatial portion of the one of the at least one second object of interest. The method may further comprise updating, based on the updated instance of the at least one secondary spatial portion, the display of the visualization of the at least one secondary spatial portion of the one of the at least one second object of interest.

The method may further comprise triggering display of an instruction to arrange the first object of interest in the first spatial portion. This instruction may be displayed in response to obtaining the scene data.

For example, at least one of the requirements fulfils at least one of the following requirements: it is patient-specific; it is associated with a type of surgery selected by the user; it is associated with a surgical procedure selected by the user.

The at least one item may comprise or consist of a part of a patient's body. The first object of interest may be a medical device. As an alternative, the first object of interest may comprise the part of the patient's body. In this case, the at least one item may be a medical device. As a still further alternative, each of the at least one item, the first object of interest, and the at least one second object of interest may be a medical device.

In one particular variant, one or more of the following conditions may be fulfilled: (i) the (e.g., stationary) medical device may be configured to be arranged in a stationary or fixed position in the operating room; (ii) the medical device may comprise or be a a component of a clinical tracking system, for example an electromagnetic field generator of an electromagnetic tracking system; (iii) the medical device may be configured to be arranged spatially fixed relative to the patient's body; (iv) the medical device may comprise or be a tracking marker configured to be tracked by a surgical tracking system, for example an electromagnetic sensor configured to be tracked by an electromagnetic tracking system or an optical tracking marker configured to be tracked by an optical tracking system; (v) the medical device may not be a handheld device, wherein handheld devices may include a pointer, a drill, a screwdriver or a navigated surgical instrument.

The visualization may be triggered to be displayed overlaid onto a view of at least a part of the operating room.

The visualization may be triggered to be displayed on a display of an augmented reality device, ARD, for example a head-mounted display, HMD.

The HMD may comprise at least one sensor chosen from an optical sensor and a depth sensor. The method may further comprise obtaining sensor data captured by the at least one sensor, detecting, based on the sensor data, at least one component chosen from the first object of interest and the at least one item, determining a spatial relationship between the detected at least one component and the HMD, and determining the visualization based on the spatial relationship between the detected at least one component and the HMD.

According to a second aspect, a processing system is provided. The processing system comprises at least one processor, the at least one processor being configured to carry out the method according to the first aspect. For example, (e.g., one or more of) the at least one processor is configured to: obtain a spatial pose of at least one item arranged within the operating room; obtain one or more requirements on a spatial relationship between a first object of interest and the at least one item arranged within the operating room; and use the obtained spatial pose and the obtained one or more requirements to trigger display of a visualization of at least one primary spatial portion to guide a user on where to arrange the first object of interest in the operating room, the at least one primary spatial portion being chosen from (a) a first spatial portion in which the first object of interest is recommended to be arranged, the first spatial portion being larger than the first object of interest, and (b) a second spatial portion in which the first object of interest is not allowed to be arranged. Another (e.g., one or more) of the at least one processor may be configured to obtain sensor data captured by at least one sensor of a HMD chosen from an optical sensor and a depth sensor, detect, based on the sensor data, at least one component chosen from the first object of interest and the at least one item, determine a spatial relationship between the detected at least one component and the HMD, and, optionally, determine the visualization based on the spatial relationship between the detected at least one component and the HMD.

According to a third aspect, a computer program is provided. The computer program comprises instructions which, when the program is executed by at least one processor (e.g., the processor of the processing device according to the second aspect), cause the at least one processor to carry out the method according to the first aspect.

According to a fourth aspect, a data carrier is provided. The data carried is carrying the computer program of the third aspect. The data carrier may be a computer-readable storage medium or a data carrier signal.

According to a fifth aspect, a surgical system is provided. The surgical system comprises the processing system according to the second aspect. The surgical system may comprise a head-mounted display, HMD, the HMD comprising at least one sensor chosen from an optical sensor and a depth sensor, wherein the at least one sensor is configured to capture sensor data enabling detection of at least one component chosen from the first object of interest and the at least one item described herein. The surgical system may further comprise a display unit configured to display at least one information chosen from the visualization described above and the instruction described above. The display unit may be configured to display the at least one information in an augmented manner. The display unit may be an augmented reality display unit. The display unit may be part of the ARD described herein. The surgical system may comprise the ARD. The display unit may be comprised in the HMD that is comprised in the surgical system. The surgical system may further comprise at least one component chosen from (i) the at least one item described above, (ii) the first object of interest described above and (iii) one or more of the at least one second object of interest described above. The surgical system may alternatively or additionally to the ARD or HMD comprise a tracking system configured to obtain or track a pose of the at least one component (e.g., in a tracking coordinate system). The processing system may have access to information indicating a relative pose between the ARD and the tracking coordinate system.

BRIEF DESCRIPTION OF THE DRAWINGS

Further details, advantages and aspects of the present disclosure will become apparent from the following embodiments taken in conjunction with the drawings, wherein.

DETAILED DESCRIPTION

Figure 1:
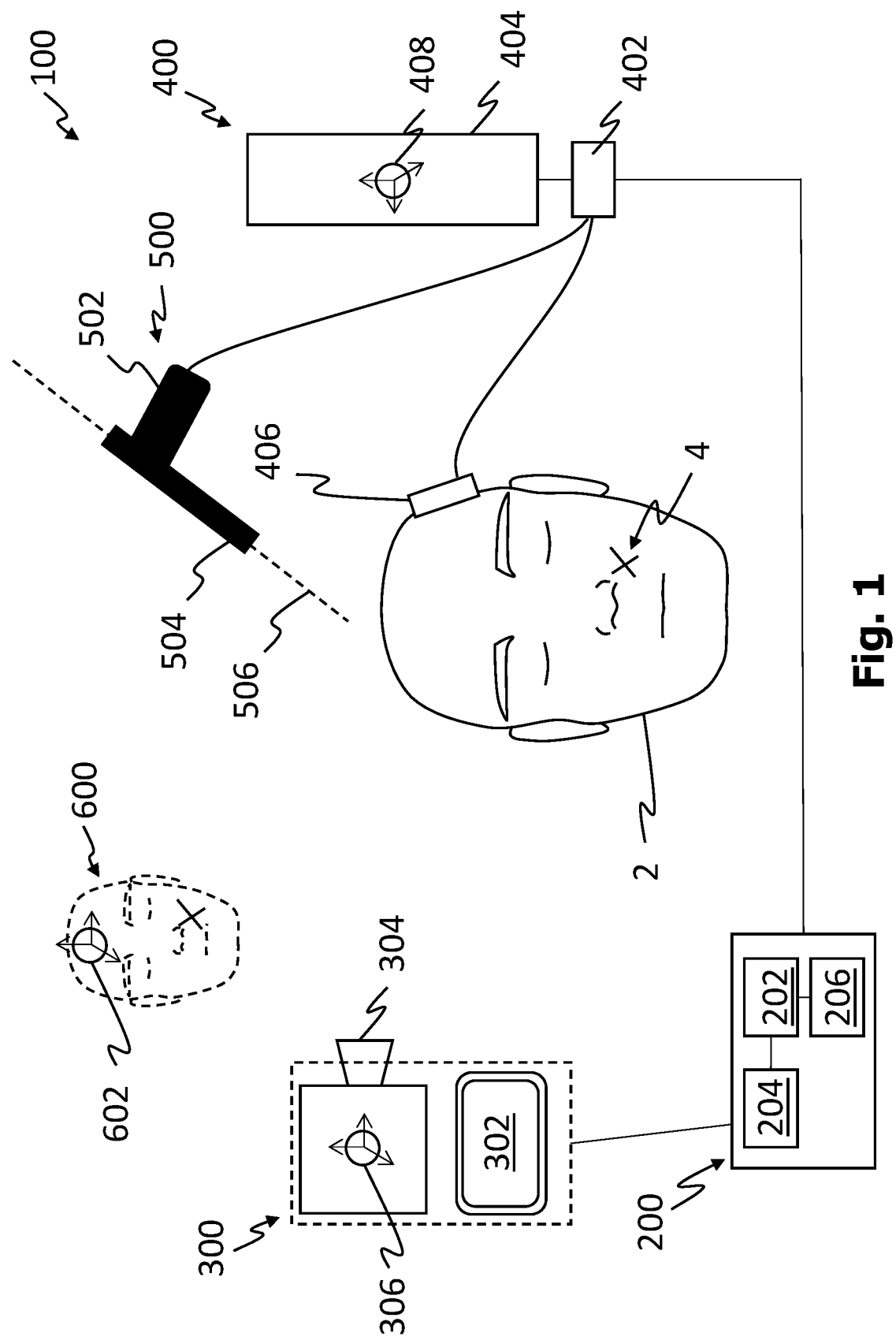
FIG. 1 shows a surgical system in accordance with the present disclosure.

In the following description, exemplary embodiments of a method, a processing system, a surgical navigation system and a computer program will be explained with reference to the drawings. The same reference numerals will be used to denote the same or similar structural or functional features.

FIG. 1 shows a surgical system 100 in accordance with the present disclosure. The surgical system 100 comprises a processing system 200. The processing system 200 comprises at least one processor 202, at least one memory 204 and at least one interface 206. The processor 202 is connected to the memory 204 and to the interface 206. The memory 204 stores instructions, for instance in the form of a computer program. The instructions may configure the processor 202 to perform the method described herein. It is noted that the method described herein may be performed by a plurality of processors, which may or may not be arranged in different locations.

The surgical system 100 further comprises an augmented reality device, ARD, 300 comprising a display unit 302 and a sensor 304. The ARD 300 may be configured as a head-mounted display, HMD, for example as augmented reality glasses. The ARD 300 may comprise one or more of the processors (not shown in FIG. 1) configured to perform (e.g., at least a part of) the method described herein.

The display unit 302 may be configured to display information in an augmented manner, for instance overlaid onto a view of an operating room in which the ARD 300 is located. The display unit 302 may be configured as a head-up display or a holographic display, thereby displaying the information on an optically transparent component. Alternatively, the display unit 302 may be configured to display a video or still image captured by a camera of the ARD 300 and display the information overlaid thereon. The display 302 may display the information upon receiving corresponding instructions (e.g., comprising the content to be displayed and, optionally, a trigger instruction indicating when to display the content) from the processing system 200, for example from the processor 202, for example via the interface 206.

It is noted that the display unit 302 may be part of a different component, i.e., may not be included in the ARD 300. For instance, the display unit 302 may be a display screen of a surgical navigation system or a standalone display. If not indicated otherwise, in case reference is made to displaying information (e.g., a visualization or an instruction) herein, this is to be interpreted as relating to a display on the display unit 302, irrespective of whether the display unit 302 is part of the ARD 300 or not.

In some variants, the sensor 304 comprises a depth sensor (e.g., a time of flight sensor, a stereo camera or a Lidar sensor). Alternatively or additionally, the sensor 304 comprises an optical sensor (e.g., a camera or a stereo camera). The sensor 304 is configured to acquire sensor data representing a surrounding, or environment, of the ARD 300 in a coordinate system 306 of the sensor 304. In case the ARD 300 is positioned in an operating room of a hospital, the sensor data represents at least a part of the operating room, for example spatial information thereof. The sensor data may be (e.g., wirelessly) transmitted from the ARD 300 to the processing system 200, for example via the at least one interface 206.

The surgical system 100 further comprises a tracking system 400. The tracking system 400 in the illustrated example comprises a localizer 402, an electromagnetic field generator 404 and an electromagnetic sensor 406. The localizer 402 is configured to determine a pose (i.e., at least one of a position and an orientation) of the sensor 406 in a tracking coordinate system 408. In the example shown in FIG. 1, the electromagnetic sensor 406 is attached (e.g., removably fastened, glued or sticked) onto a head 2 of a patient.

Additional electromagnetic sensors may also be provided. For example, a surgical instrument 500 may comprise an additional electromagnetic sensor such that the localizer 402 can determine a pose of the surgical instrument 500 in the tracking coordinate system 408. In the illustrated example, the surgical instrument 500 comprises a grip portion 502 and an elongate element 504 attached to the grip portion 502. The elongate element 504 extends longitudinally along an instrument axis 506. The surgical instrument 500 may be a guiding instrument for inserting a biopsy needle along the instrument axis 506 into a planned insertion point 4 on the head 2 of the patient.

The tracking system 400 may alternatively be an optical tracking system. In this case, the tracking system 400 may comprise a stereo camera configured to track one or more active or passive optical tracking markers. The surgical system 100 may comprise both an electromagnetic tracking system and an optical tracking system.

Also schematically illustrated in FIG. 1 are patient image data 600. The patient image data 600 may comprise preoperatively or intraoperatively acquired medical images of the head 2 of the patient. These images may comprise computer tomography, CT, image data or magnetic resonance, MR, image data. The patient image data 600 is associated with an image coordinate system 602.

Using known registration techniques, transformations between two or more of the coordinate systems 306, 408 and 602 can be determined. For example, several points on a surface of the head 2 of the patient may be acquired using the instrument 500 tracked by the localizer 402 in the coordinate system 408. These points may be matched to a surface model of the patients head 2 as described by or detected in the patient image data 600. This results in a transformation between the coordinate systems 408, 602. As another example, the ARD 300 may comprise an electromagnetic sensor trackable by the localizer 402. Alternatively, the ARD 300 may be provided with an optical tracking marker trackable by the optical tracking system. This allows for determining a transformation between the coordinate systems 306, 408. Other variants of determining the transformations between the coordinate systems 306, 408 and 602 are also possible, as will be apparent to those skilled in the art. Whenever spatial information (e.g. a pose or a spatial relationship between two components) is described in one of the coordinate systems 306, 408, 602, it may be transformed into one or more of the other coordinate systems (e.g., for comparison with another spatial information) using these transformation(s).

In case reference is made in the following to one of the components of the surgical system 100, it is not necessarily required to provide one or more or all other components of the surgical system 100. For example, reference may be made in the following to the display unit 302. It may then not be required to provide the tracking system 400, the patient image data 600 or the surgical instrument 500. Put differently, the surgical system 100 does not necessarily comprise all components described with reference to FIG. 1. In one variant, the surgical system 100 comprises the processing system 200 and the display unit 302.

Figure 2:
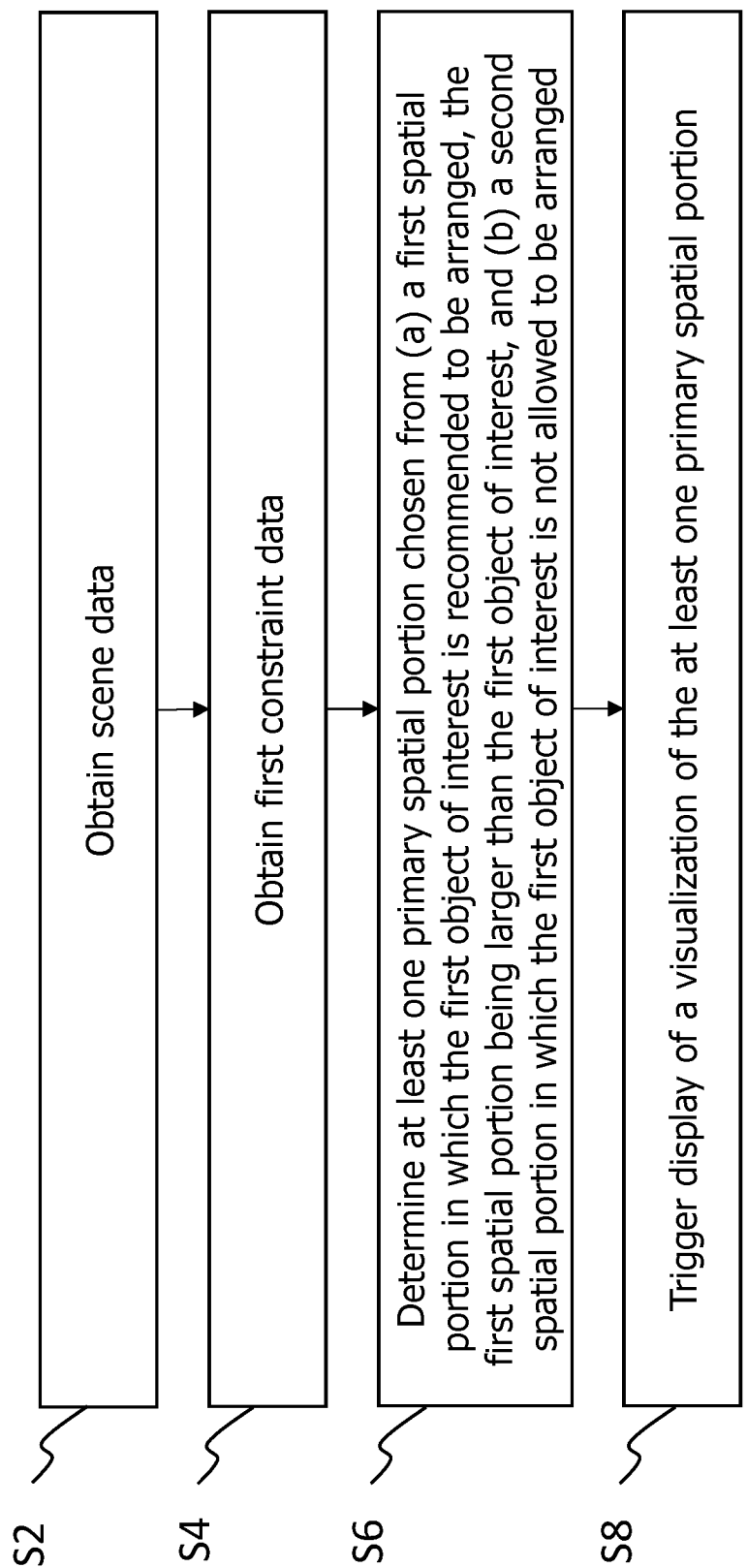
FIG. 2 shows a method in accordance with the present disclosure.

FIG. 2 illustrates a method in accordance with the present disclosure. The method may be performed by the processor 202 of the processing system 200. The computer program stored in the memory 204 may, when executed by the processor 202, configure the processor 202 to perform the method as described herein. The method is not limited thereto and may be performed by another processor.

The method comprises a step S2 of obtaining scene data indicative of a spatial pose of at least one item arranged within the operating room.

The scene data may be based on data acquired by the sensor 304. The scene data may be based on data obtained from the tracking system 400. The scene data may comprise spatial information on a portion of the operating room comprising the at least one item. The spatial information may be associated with one or both coordinate systems 306, 408. Although other variants are possible, the at least one item may comprise or consist of a patient's body or a portion thereof.

The method comprises a step S4 of obtaining first constraint data indicative of one or more requirements on a spatial relationship between a first object of interest and the at least one item arranged within the operating room.

The first constraint data may be specific for the first object of interest. The first constraint data may be specific for a type of surgery or for a surgical procedure selected by the user. The one or more requirements may comprise at least one of a minimum distance, a maximum distance, a minimum relative angle and a maximum relative angle between the first object of interest and the at least one item. The one or more requirements may comprise at least one of a minimum distance, a maximum distance, a minimum relative angle and a maximum relative angle between (i) the first object of interest and (ii) a certain part of the at least one item, a certain point on the at least one item or a certain path with respect to the at least one item. The certain part, point or path may be defined by planning data (e.g., in the coordinate system 602). The certain part may be a tumor within the patient's body. The certain point may be a planned entry point on the patient's body (e.g., the point 4). The certain path may be a planned trajectory such as a planned insertion trajectory (e.g., of a biopsy needle or a surgical drill). The method may comprise obtaining the planning data to determine the one or more requirements on the spatial relationship between the first object of interest and the patient's body. Although other variants are possible, the first object of interest may be the electromagnetic field generator 404.

The method comprises a step S6 of determining, based on the scene data and the first constraint data, at least one primary spatial portion chosen from (a) a first spatial portion in which the first object of interest is recommended to be arranged, the first spatial portion being larger than the first object of interest, and (b) a second spatial portion in which the first object of interest is not allowed to be arranged.

Determining the first spatial portion may comprise: obtaining object data indicative of a surface of the first object of interest; determining, based on the scene data and the first constraint data, a plurality of poses in which the first object of interest is recommended to be arranged; and determining a virtual surface for each of the plurality of poses based on the object data, wherein the first spatial portion encloses all virtual surfaces. The plurality of recommended poses may each fulfil at least one of the requirements indicated by the first constraint data. Similarly, determining the second spatial portion may comprise: obtaining object data indicative of a surface of the first object of interest (e.g., if not already obtained for determining the first spatial portion); determining, based on the scene data and the first constraint data, a plurality of poses in which the first object of interest is not allowed to be arranged; and determining a virtual surface for each of the plurality of poses based on the object data, wherein the second spatial portion encloses all virtual surfaces.

Alternatively or additionally, the method may comprise, once one of the first portion and the second portion have been determined, using an inverse of the determined portion (e.g., all spatial portions that are not part of the determined portion) as the other of the first portion and the second portion. It is noted that in one variant, the first spatial portion does not necessarily need to be larger than the first object of interest. For example, the first spatial portion may comprise only one virtual surface (e.g., if there is only one pose in which the first object of interest is recommended to be arranged). The method comprises a step S8 of triggering display of a visualization of the at least one primary spatial portion to guide a user on where to arrange the first object of interest in the operating room.

The visualization of the first spatial portion informs the user in which area or volume of the operating room the first object of interest should be arranged. On the other hand, the visualization of the second spatial portion informs the user in which area or volume of the operating room the first object of interest is not to be arranged. This supports the user in arranging the first object of interest in a recommended position and orientation without having to bear in mind corresponding setup information (e.g., provided in a user manual of the first object of interest).

The spatial portions described herein may be two-dimensional or three-dimensional spatial portions. Accordingly, the visualization of the respective spatial portion(s) described herein may be a two-dimensional or a three-dimensional visualization.

The visualization(s) described herein may be displayed on the display 302. The visualization(s) described herein may be displayed relative to (e.g., overlaid onto) an acquired image or a view of (e.g., at least a part of) the operating room. The visualization(s) described herein may be displayed relative to (e.g., overlaid onto) the patient image data 600. In the latter case, the method may comprise obtaining the patient image data 600. The method may also comprise obtaining a transformation between the coordinate system 602 and the coordinate system in which the spatial pose of the at least one item is indicated by the scene data (e.g., the coordinate system 306 or 408). The method may comprise transforming the at least one primary spatial portion into one or more of the coordinate systems 306, 408, 602 (e.g., using one or more transformations as described above).

Figure 3:
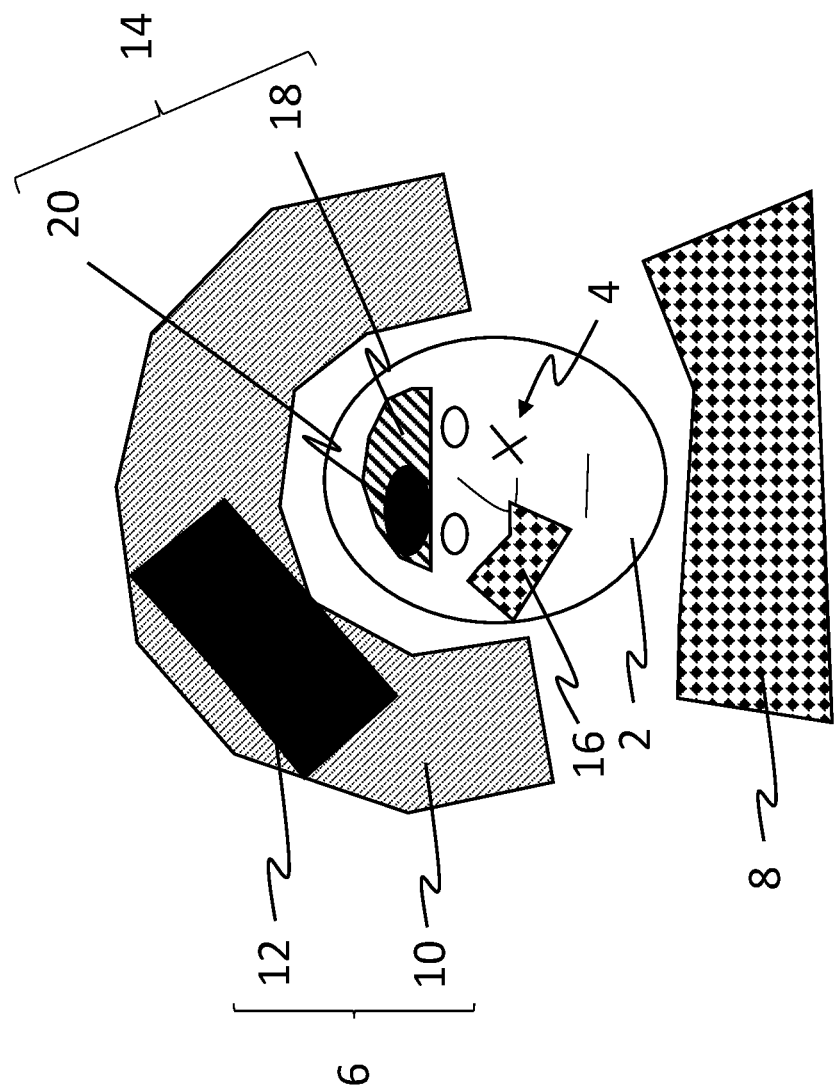
FIG. 3 schematically illustrates an exemplary display content, before placement of an object, in accordance with the present disclosure.

FIG. 3 schematically illustrates an exemplary display content in accordance with the present disclosure. As can be seen, the display content includes the patient's head 2 and the planned entry point 4. The item arranged in the operating room in this case corresponds to the patient's head 2. The display content further includes the visualization of the first spatial portion 6 and the visualization of the second spatial portion 8. The first spatial portion 6 extends around the patient's head 2 in a cranial and lateral area or volume. The first spatial portion in this example denotes a volume in which the field generator 404 is to be arranged relative to the patient's head 2. In other words, the first object of interest in this example is the field generator 404. The second spatial portion 8 extends next to the patient's head 2 in a caudal volume. The second spatial portion 8 informs the user about a volume in which the field generator 404 is not allowed to be arranged. It can be seen that the portion 8 does not take up the whole volume except the portion 6. In other words, there are volumes that are not visualized or visually highlighted. This may be because the field generator may be allowed to be arranged in other poses external to the portion 6, although it is not recommended. When presented with the view shown in FIG. 3, the user is informed in an easily understandable manner where and how to arrange the field generator 404.

The method may further comprise triggering (e.g., in response to determining the first spatial portion) display of an instruction to arrange the first object of interest in the first spatial portion. The instruction may include an identification of the first object of interest (e.g., a name, an identification number or a picture representation thereof) to inform the user which object to place in the primary spatial portion. The instruction(s) described herein may be displayed on the same display as the visualization(s), for example on the display unit 302.

The method may comprise obtaining first alignment data indicative of a spatial relationship between the first object of interest arranged in the operating room and the at least one item. The instruction may be determined based on the first alignment data. The instruction may indicate at least one of the one or more requirements of the first constraint data and whether or to what extent the at least one requirement is fulfilled by a current pose of the at least one first object of interest. In one variant, instead of steps S6 and S8, the method may comprise obtaining the first alignment data and determining the instruction based thereon (e.g., the instruction indicating at least one of the one or more requirements of the first constraint data and whether or to what extent the at least one requirement is fulfilled by a current pose of the first object of interest). The method may then further comprise triggering display of this instruction.

To provide an even further improved guidance for the user, different sub-portions of the determined spatial portions may be ranked or prioritized. This ranking or prioritization may also be visualized. For example, the first spatial portion may comprise at least two first sub-portions. Each first sub-portion comprises at least one recommended position of the first object of interest, and each of the first sub-portions is associated with a different degree of recommendation (e.g., a different degree of prioritization). The visualization of the first spatial portion may then comprise a distinguishable visualization of each first sub-portion. For instance, the first sub-portions may be visualized differently using different colors or opacities.

The degree of recommendation of a sub-portion may be higher the more of the requirements (e.g., as indicated by the first constraint data) are fulfilled when arranging the first object in the respective sub-portion. Alternatively or additionally, the requirements indicated by the first constraint data may be associated with respective priority values, wherein the degree of recommendation of a sub-portion is higher the higher the priority values of the fulfilled requirements (e.g., when arranging the first object in the respective sub-portion) are.

Referring again to FIG. 3, the first spatial portion 6 comprises sub-portions 10, 12. The sub-portion 12 comprises poses of the first object of interest that fulfill more of the requirements than all poses of the first object of interest comprised in the sub-portion 10. In other words, the sub-portion 12 is prioritized (e.g., because placing the field generator 404 in the first sub-portion 12 enables a most accurate tracking of a biopsy needle inserted into the point 4).

The method may comprise obtaining, for each of at least one second object of interest, second constraint data indicative of one or more requirements on a spatial relationship between the second object of interest and the first object of interest.

The second constraint data may be specific for at least one of the first object of interest and the at least on second object of interest. The second constraint data may be specific for a type of surgery or for a surgical procedure selected by the user. The one or more requirements may comprise at least one of a minimum distance, a maximum distance, a minimum relative angle and a maximum relative angle between the at least one second object of interest and the first object of interest. The at least one second object of interest may comprise a patient tracker (e.g., the electromagnetic sensor 406 or an optical tracking marker attached to the patient's body).

The method may further comprise determining, for each of the at least one second object of interest, based on the determined primary spatial portion and the second constraint data, at least one secondary spatial portion chosen from (a) a third spatial portion in which the second object of interest is recommended to be arranged, and (b) a fourth spatial portion in which the second object of interest is not allowed to be arranged.

Determining the third spatial portion for a second object of interest may comprise: obtaining object data indicative of a surface of the second object of interest; determining, based on the determined primary spatial portion and the second constraint data, a plurality of poses in which the second object of interest is recommended to be arranged; and determining a virtual surface for each of the plurality of poses based on the object data, wherein the third spatial portion encloses all virtual surfaces. The plurality of recommended poses may each fulfil at least one of the requirements indicated by the second constraint data. Similarly, determining the fourth spatial portion for a second object of interest may comprise: obtaining object data indicative of a surface of the second object of interest (e.g., if not already obtained for determining the third spatial portion); determining, based on the determined primary spatial portion and the second constraint data, a plurality of poses in which the second object of interest is not allowed to be arranged; and determining a virtual surface for each of the plurality of poses based on the object data, wherein the fourth spatial portion encloses all virtual surfaces. Alternatively or additionally, the method may comprise, once one of the third portion and the fourth portion have been determined, using an inverse of the determined portion (e.g., all spatial portions that are not part of the determined portion) as the other of the third portion and the fourth portion. The third spatial portion may be larger than the second object of interest. It is noted that in one variant, the third spatial portion does not necessarily need to be larger than the second object of interest. For example, the third spatial portion may comprise only one virtual surface (e.g., if there is only one pose in which the second object of interest is recommended to be arranged).

In one variant, the second constraint data is further indicative of one or more requirements on a spatial relationship between the second object of interest and the at least one item arranged in the operating room. The secondary spatial portion may then be determined further based on the scene data. One may say that the secondary spatial portion in this variant not only depends indirectly on the pose of the item by depending on the determined primary spatial portion (e.g., the first spatial portion), but depends directly on the pose of the at least one item.

As noted above, the method may comprise triggering, for each of the at least one second object of interest, display of a visualization of the at least one secondary spatial portion to guide a user on where to arrange the at least one second object of interest in the operating room.

Referring again to FIG. 3, the visualization of the third spatial portion is denoted by reference sign 14 and the visualization of the fourth spatial portion is denoted with reference sign 16. In the present example, the second object of interest is the sensor 406 that is to be attached onto the head 2 of the patient before beginning a surgical procedure (e.g., before inserting a biopsy needle into the point 4). It can be seen that the third spatial portion 14 and the fourth spatial portion 16 each differ from the first and the second spatial portions 6, 8. This is only an advantageous example, and it may well be possible for the third and the fourth spatial portion 14, 16 to overlap one or both of the first and the second spatial portion 6, 8.

Similarly to the first spatial portion, different sub-portions of the third spatial portion may be prioritized differently. The third spatial portion may therefore comprise at least two third sub-portions, each third sub-portion comprising at least one recommended position of the second object of interest, wherein each of the third sub-portions is associated with a different degree of recommendation. The visualization of the third spatial portion may comprise a distinguishable visualization of each third sub-portion.

The degree of recommendation of a sub-portion may be higher the more of the requirements (e.g., as indicated by the second constraint data) are fulfilled when arranging the first object in the respective sub-portion. Alternatively or additionally, the requirements indicated by the second constraint data may be associated with respective priority values, wherein the degree of recommendation of a sub-portion is higher the higher the priority values of the fulfilled requirements (e.g., when arranging the first object in the respective sub-portion) are.

Referring again to FIG. 3, the third spatial portion 14 comprises sub-portions 18, 20 visualized in a different manner. The sub-portion 20 has a higher degree of priority than the sub-portion 18, because when the sensor 406 is arranged in the sub-portion 20, more of the requirements of the second constraint data, or higher prioritized requirements of the second constraint data, are fulfilled compared with when the sensor 406 is arranged in the sub-portion 18.

The visualizations may be updated accordingly upon placement of the first object of interest or the second object of interest.

As noted above, the method may comprise obtaining first alignment data indicative of a spatial relationship between the first object of interest arranged in the operating room and the at least one item.

The first alignment data may be obtained from at least one of the ARD 300 and the tracking system 400. The first alignment data may indicate a relative spatial relationship (e.g., a relative pose) between the first object of interest and the at least one item as captured by the sensor 304 or the localizer 402. As an example, the ARD 300 may capture a depth image of the patient's head 2 and of the field generator 404. The first alignment data may then be determined based on the depth image by detecting both the head 2 and the field generator 303 in the depth image and determining the spatial relationship therebetween (e.g., in the coordinate system 306). Other variants are possible. For example, relative poses between the field generator 404 and the head 2 may be captured by an optical tracking system (e.g., by localizing an optical tracking marker attached to the head 2 and an optical tracking marker attached to the field generator 404).

The method may comprise determining, for each of the at least one second object of interest, an updated instance of the at least one secondary spatial portion based on the second constraint data and the first alignment data. The updated instance of the at least one secondary spatial portion may be determined in a similar way as described above for the at least on secondary spatial portion, but use the pose of the at least one item instead of the primary spatial portion during the determination. In result, this will in most cases lead to a smaller updated secondary spatial portion (e.g., taking only a current pose of the item as a reference for the requirements of the second constraint data) compared to the secondary spatial portion (e.g., taking all poses within the primary spatial portion as a reference for the requirements of the second constraint data). One may therefore say that the placement of the first object of interest influences or affects the third (e.g., and the fourth) spatial portion.

The method may comprise updating, for each of the at least one second object of interest, the display of the visualization of the at least one secondary spatial portion based on (e.g., by triggering display of) the updated instance of the at least one secondary spatial portion.

Figure 4:
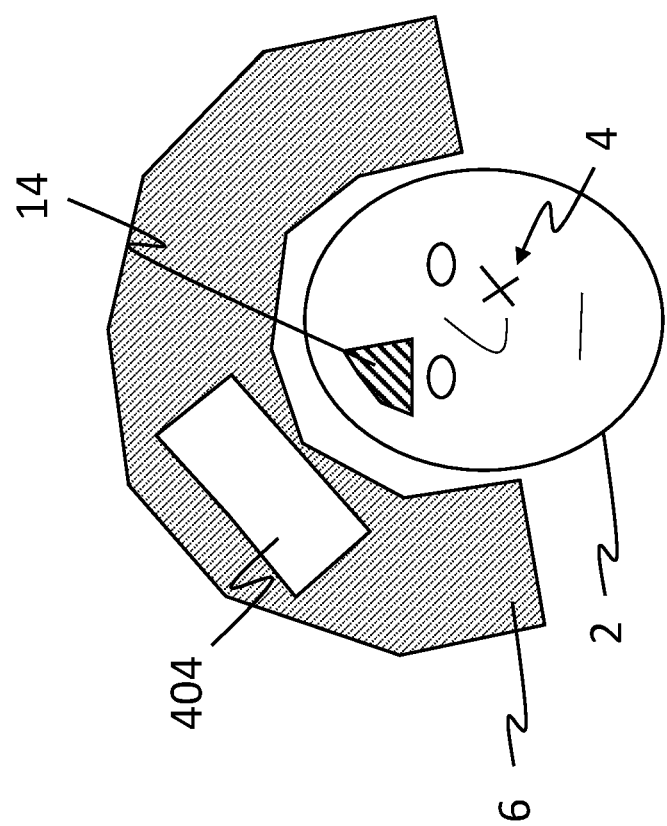
FIG. 4 schematically illustrates an exemplary display content, after placement of only a first object, in accordance with the present disclosure.

FIG. 4 schematically illustrates the display content of FIG. 3, but after the field generator 404 has been placed in the first spatial portion 6. In this case, the field generator 404 was placed in an optimal manner, namely, in the most prioritized sub-portion 12. Although it is not required, the visualization of the primary spatial portion, for example the visualization of the first and/or the second spatial portion 10, 12, may still be visualized despite placement of the first object of interest in the first spatial portion 10. In the given example, only the first spatial portion 10 is still visualized, whereas the second spatial portion 8 is no longer shown. It can also be seen that by placing the field generator 404 in the first spatial portion 10, the third spatial portion 14 is updated accordingly. Namely, instead of determining all recommended poses for the sensor 406 relative to all potential poses of the field generator 404 comprised in the first spatial portion 10, the updated instance of the third spatial portion 14 is only determined using the actual pose of the field generator 404. For that reason, the updated third spatial portion 14 shown in FIG. 4 is smaller compared with the third spatial portion 14 shown in FIG. 3.

The updated instance of the at least one secondary spatial portion may be determined in response to or as a reaction to the first alignment data indicating that the first object of interest is arranged within the first spatial portion. Again, this responsive determination may avoid unnecessary re-computations.

An instruction to arrange one or more of the at least one second object of interest in the third spatial portion may be triggered to be displayed responsive to the first alignment data indicating that the first object of interest is arranged within the first spatial portion. The instruction may alternatively be triggered to be displayed upon determining the third spatial portion.

The instruction may comprise an identification of the at least one second object of interest. In case of a plurality of second objects of interest, sequence data may be obtained. The sequence data may be indicative of a recommended sequence of placement of the plurality of second objects of interest. The recommended sequence may be associated with a type of surgery or a surgical procedure selected by a user. The recommended sequence may be patient-specific. The recommended sequence may be specific for at least one component chosen from the item and the first object of interest. The instruction may be determined based on the sequence data and comprise an identification of a second object of interest recommended to be placed next.

The method may comprise obtaining second alignment data indicative of a spatial relationship between the at least one primary spatial portion and one or more of the at least one second object of interest arranged in the operating room. The instruction may be determined based on the second alignment data. The instruction may indicate at least one of the one or more requirements of the second constraint data and whether or to what extent the at least one requirement is fulfilled by a current pose of the at least one second object of interest. The method may comprise obtaining the second alignment data and determining the instruction based thereon (e.g., the instruction indicating at least one of the one or more requirements of the second constraint data and whether or to what extent the at least one requirement is fulfilled by a current pose of the at least one second object of interest). The method may then further comprise triggering display of this instruction.

As described above, placement of the first object of interest may influence the secondary spatial portion. In a similar manner, placement of the second object of interest may affect the primary spatial portion.

The method may comprise determining an updated instance of the at least one primary spatial portion based on the second constraint data and the second alignment data.

The second alignment data may be obtained from at least one of the ARD 300 and the tracking system 400. The second alignment data may indicate a relative spatial relationship (e.g., a relative pose) between the second object of interest and at least one of the first object and the at least one item as captured by the sensor 304 or the localizer 402. As an example, the ARD 300 may capture a depth image of the field generator 404 and of the sensor 406. The first alignment data may then be determined based on the depth image by detecting both the field generator 404 and the sensor 406 in the depth image and determining the spatial relationship therebetween (e.g., in the coordinate system 306). Other variants are possible. For example, a relative pose between the field generator 404 and the sensor 406 may be captured by the tracking system 400 (e.g., by the localizer 402).

The method may comprise updating the display of the visualization of the at least one primary spatial portion based on (e.g., by triggering display of) the updated instance of the at least one primary spatial portion. In other words, the displayed primary spatial portion may react to the placement of the at least one second object of interest. Simultaneously or subsequently, for example responsive to determining the updated instance of the primary spatial portion, the secondary primary spatial portion may be updated (e.g., again) as well. As noted above, it may not be required to display the visualizations of the primary or the secondary spatial portion after placement of both the first and the second object of interest. Nevertheless, displaying these visualizations may allow a user to move and re-position the first and the second object of interest within the respective first and third spatial portions to optimize their placement (e.g., by arranging each of the objects of interest in a higher-ranked sub-portion).

Figure 5:
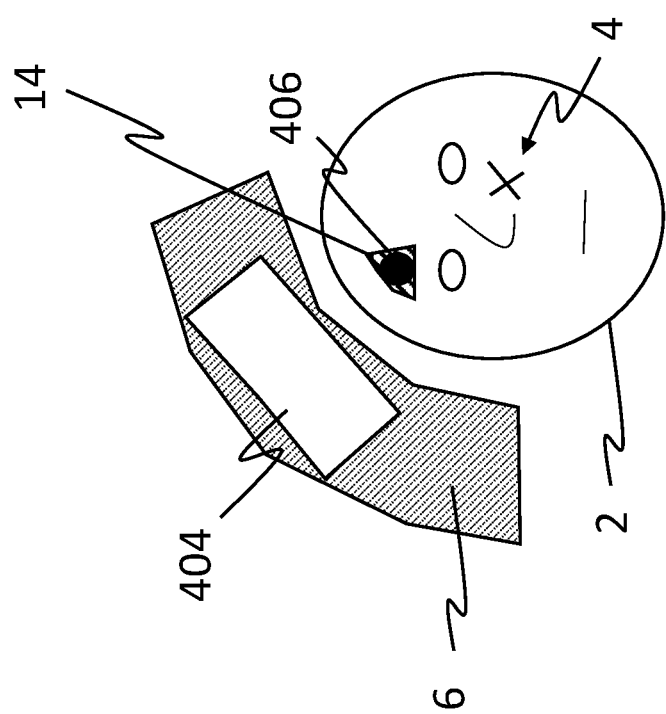
FIG. 5 schematically illustrates an exemplary display content, after placement of a first object and a second object, in accordance with the present disclosure.

FIG. 5 illustrates an updated display content that corresponds to that shown in FIG. 4, but after a second object of interest has been placed. In this example, the second object of interest corresponds to the sensor 406. Compared with FIG. 4, it can be seen that the first spatial portion 6 has decreased in size (e.g., volume). This is because the first spatial portion 6 in FIG. 5 has been updated by comparing the requirements indicated by the second constraint data with the captured pose of the patient tracker 406. Compared to FIG. 4, the size of the third spatial portion 14 has decreased, because the third spatial portion 14 is updated based on the updated instance of the primary spatial portion, for example based on the updated, smaller first spatial portion 6.

An instruction indicating at least one of the one or more requirements of the second constraint data and whether or to what extent the at least one requirement is fulfilled by a current pose of the at least one second object of interest (e.g., and a current pose of the first object of interest) may be visualized.

To avoid unnecessary re-calculations of the primary spatial portion, the updated instance of the at least one primary spatial portion may be determined responsive to the second alignment data indicating that the one or more of the at least one second object of interest are arranged within the third spatial portion determined for the one or more of the at least one second object of interest.

Figure 6:
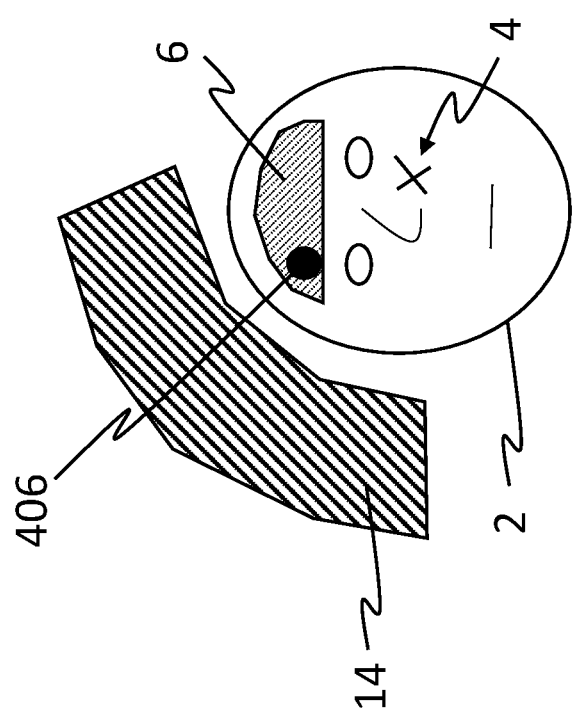
FIG. 6 schematically illustrates an exemplary display content, after placement of only a first object, in accordance with the present disclosure.

In deviation from FIGS. 3 to 5, the first object of interest may correspond to the patient tracker, for example the sensor 406. The second object of interest may then correspond to the field generator 404. Also in this case, the initial display content before placement of the first or second object of interest may correspond to that of FIG. 3, whilst the reference signs of the primary spatial portion 6, 8, 10, 12 on the one hand and the secondary spatial portion 14, 16, 18, 20 on the other hand would need to be interchanged. Upon placement of the sensor 406 in the first spatial portion 6, the third spatial portion 14 may be updated. The resultant display content is exemplarily illustrated in FIG. 6. In case the sensor 406 is the second object of interest, and placed inside the third spatial portion before the field generator 404 is placed in the first spatial portion, the resulting display content may correspond to that shown in FIG. 6 whilst the reference signs 14, 6 would need to be interchanged.

It is noted that the present disclosure is not limited to a single second object of interest. A user may be guided on where to place multiple second objects of interest. For each of the second objects of interest, a separate instance of the secondary spatial portion and, optionally, a separate instruction may be determined and visualized.

Figure 7:
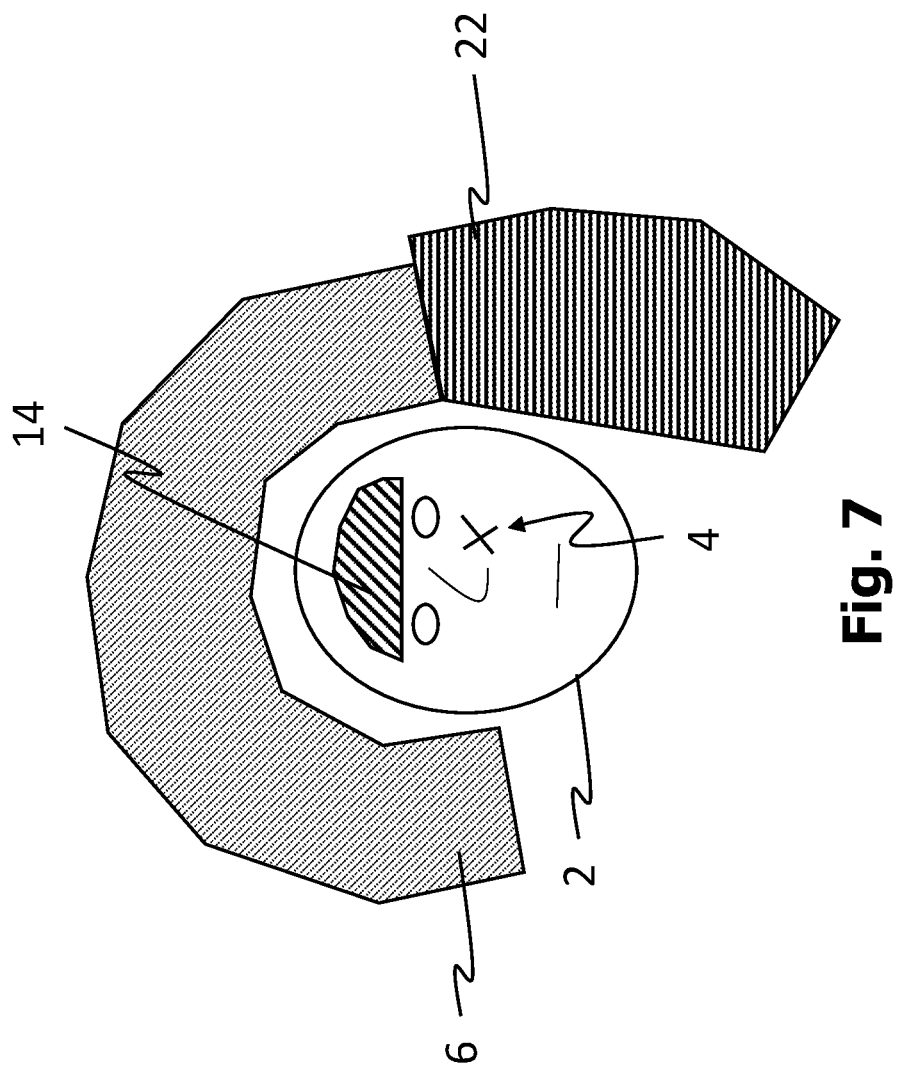
FIG. 7 schematically illustrates an exemplary display content, before placement of an object, in accordance with the present disclosure.

As illustrated in FIG. 7, the display content may comprise a visualization of a plurality of third spatial portions 14, 22. In the example of FIG. 7, the first spatial portion 6 is associated with the field generator 404 (e.g., the field generator 404 is to be placed within the first spatial portion 6), the third spatial portion 14 is associated with the sensor 406 and another third spatial portion 22 is associated with another second object of interest (e.g., the surgical instrument 500 configured as a biopsy needle guide).

The individual (e.g., instances of) secondary spatial portions, for example the individual third spatial portions may be affected by placement of one or more of the second objects of interest. One may say that the secondary spatial portions affect one another.

The method may further comprise obtaining, for one of the at least one second object of interest (e.g., the sensor 406), third constraint data indicative of one or more requirements on a spatial relationship between the one of the at least one second object of interest (e.g., the sensor 406) and another one or more of the at least one second object of interest (e.g., the instrument 500), wherein the at least one secondary spatial portion of the one of the at least one second object of interest (e.g., the third spatial portion 14 associated with the sensor 406) is determined further based on the third constraint data. The degree of recommendation of the third spatial portion of one of the at least one second object of interest the may then alternatively or additionally depend on the third constraint data.

The third constraint data may be specific for the one of the one of the at least one second object of interest. The third constraint data may be specific for the another one or more of the at least one second object of interest. The third constraint data may be specific for a type of surgery or for a surgical procedure selected by the user. The one or more requirements may comprise at least one of a minimum distance, a maximum distance, a minimum relative angle and a maximum relative angle between the one of the at least one second object of interest and the another one or more of the at least one second object of interest.

The method may further comprise obtaining third alignment data indicative of a spatial relationship between (i) the at least one secondary spatial portion of the one of the at least one second object of interest (e.g., the sensor 406) and (ii) the another one or more of the at least one second object of interest (e.g., the instrument 500) arranged in the operating room. The third alignment data may describe a spatial relationship between the third spatial portion (e.g., the third spatial portion 14) and one of the second objects of interest not associated with the third spatial portion (e.g., the instrument 500 associated with the third spatial portion 22).

The third alignment data may be obtained from the ARD 300 or the tracking system 400. The third alignment data may be obtained similarly as described above for the first and the second alignment data.

Based on the third constraint data and the third alignment data, an updated instance of the at least one secondary spatial portion (e.g., the third spatial portion 14) of the one of the at least one second object of interest (e.g., the sensor 406) may be determined. Based on the updated instance of the at least one secondary spatial portion (e.g., the third spatial portion 14), the display of the visualization of the at least one secondary spatial portion (e.g., the third spatial portion 14) of the one of the at least one second object of interest (e.g., the sensor 406) may be updated (e.g., responsive to the third alignment data indicating that the another one or more of the at least one second object of interest have been placed within the respective third spatial portions).

As noted above, the at least one item may comprise a part (e.g., the head 2) of a patient's body or may correspond to the patient's body. Alternatively or additionally, the at least one item may correspond to a medical device. The first object of interest may be a first medical device and the at least one second object of interest may comprise or consist of at least one second medical device. The respective medical device may be one of a field generator (e.g., the field generator 404), an electromagnetic sensor (e.g., the sensor 406), a surgical instrument (e.g., the instrument 500), a biopsy needle, a stereo camera of an optical tracking system, an optical tracking marker (e.g., to be) attached to the patient, another tracker or an implant (e.g., a metal implant such as a surgical screw or a bone plate).

Although other variants are possible, the present disclosure provides for a solution in which the first object of interest shall be placed before the at least one second object of interest. Optionally, a first of the at least one second object of interest shall be placed before a second of the at least one second object of interest. This sequence may be communicated to the user by displaying the aforementioned instruction(s).

The sequence may be indicated by the sequence data as described above. A plurality of consecutive instructions may be displayed, each informing the user which object to place next. A subsequent one of the instructions may be displayed in response to the alignment data indicating that a current object of interest has been correctly placed.

In a first example, in line with what was described above with reference to FIGS. 3 to 5, the first object of interest is the field generator 404 and the (e.g., first or second of the) at least one second object of interest is the patient tracker (e.g., the sensor 406 or an optical tracking marker attached to the patient's body).

In a second example, the first object of interest is the patient tracker (e.g., the sensor 406), the first of the at least one second object of interest is the surgical instrument 500 configured as a biopsy guide and the second of the at least one second object of interest is the field generator 404 or the stereo camera of the tracking system.

In a third example, the first object of interest is the surgical instrument 500 configured as a biopsy guide, the first of the at least one second object of interest is the patient tracker (e.g., the sensor 406) and the second of the at least one second object of interest is the field generator 404 or the stereo camera of the tracking system.

In a fourth example, the first object of interest is the field generator 404 or the stereo camera of the tracking system, the first of the at least one second object of interest is the patient tracker (e.g., the sensor 406) and the second of the at least one second object is the surgical instrument 500 configured as a biopsy guide.

In a fifth example, the at least one item comprises an operating table and the first object of interest corresponds to the patient's body (e.g., the head 2). In this example, the first of the at least one second object of interest may be the field generator 404 and the second of the at least one second object of interest may be the patient tracker.

The scene data may be obtained from the ARD 300, for example from the sensor 304. The method may comprise obtaining sensor data captured by the at least one sensor 304. Based on the sensor data, at least one component chosen from the first object of interest and the at least one item may be detected (e.g., using one or more object recognition algorithms). A pose of the at least one component relative to the sensor 304, for example a pose in the coordinate system 306, may be determined after having detected the at least one component. In other words, a spatial relationship between the detected at least one component and the ARD 300 (e.g., configured as a HMD) may be determined. The method may comprise determining the visualization based on the spatial relationship between the detected at least one component and the ARD 300.

For example, the sensor 304 may be used to detect a current pose of the patient's head 2 relative to the ARD 300 (e.g., a current pose in the coordinate system 306). This may allow for overlaying the primary and the secondary spatial portion in an augmented manner in a view comprising the head 2. No tracking data may be required from a tracking system in this case, which allows for guidance on where and how to arrange components of the tracking system (e.g., where to arrange the field generator 404 and the sensor 406), even before activating the tracking system. After placement of the field generator 404 and the sensor 406, the localizer 402 (e.g., or the processor 202, using data obtained from the tracking system 400) may determine a relative pose between the field generator 404 and the sensor 406. This relative pose may be determined with a high accuracy and used to update at least one of the primary spatial portion and the secondary spatial portion.

In the following, the technique disclosed above will again be explained in other terms. The following passage is not to be considered as limiting the method described above, although the method described above may comprise one or more of the features explained in the following.

There may be specific objects (e.g., hardware components) which need to be setup in accordance with each other. For example, a tracking device (e.g., the field generator 404 or a stereo-camera of an optical tracking system) may need to be placed in relation to the patient's body (e.g., the head 2) so that the surgical site is situated within the optimal tracking volume of the tracking device. There may be certain constraints that either originate from the type of surgery (e.g., otolaryngology, cranial surgery, etc.) or a specific surgical procedure (e.g., insertion of a biopsy needle or an instrument along an entry path) that need to be fulfilled for an optimal surgery performance and outcome.

The present disclosure may be considered as providing for a technique on communicating these constraints to the user to achieve an appropriate user action.

Typical objects of interest to be placed are the field generator 404 or stereo-camera, the patient tracker (e.g., the sensor 406) or a biopsy needle. Furthermore, typical constraints for the placement of the objects are the pose of the patient's body, the pose and type of an operating table, the pose and type of a system cart and monitor, the pose and type of a Mayfield clamp or other components that influence tracking quality.

In a basic surgical navigation setup, a tracking system (e.g., the tracking system 400) may be at least measuring the pose of a patient tracker (e.g., the sensor 406) rigidly attached to the patient. During positioning of navigation system components (e.g., the field generator 404 and the sensor 406) in the operating room before starting a surgical procedure, an exact position of the patient in relation to the patient tracker might be unknown. A registration between the patient image data 600 and the tracking system 400, resulting in a transformation between the coordinate system 602, 408 may not yet be known. Nevertheless, a guidance for optimal placement of the tracking system in relation to the patient may be provided by the technique disclosed herein.

The one or more requirements indicated by the constraint data disclosed herein may be classified in two main categories: procedure information and operating room setup information.

Figure 8:
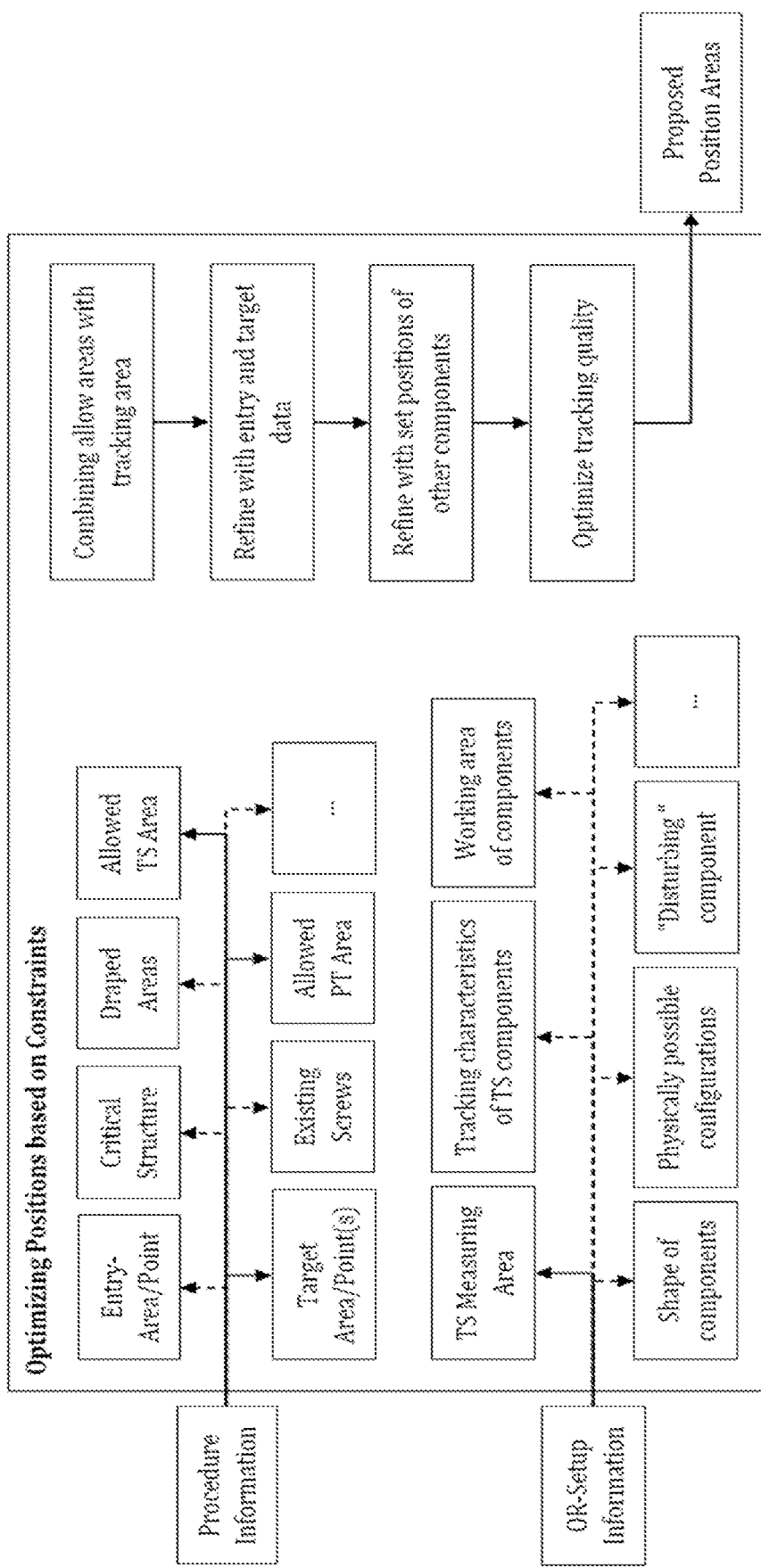
FIG. 8 schematically illustrates requirements and use thereof in accordance with the present disclosure.

The procedure information requirements may be given by the type of surgery and the surgical procedure, and, optionally, by a procedure planning (e.g., the planning data). The procedure information requirements may be used to derive an optimal pose or setup of the tracking system components (e.g., a pose of the field generator 404) and other tracking related components. The procedure information requirements are indicated in FIG. 8 and may depend on or be determined based on one or more of the (e.g., pose of the) entry point 4, a critical structure (e.g., a vessel), draped areas, an allowed tracking system area in the operating room, a target are or point, existing screws, an allowed patient tracker area, etc. The procedure information requirements may be dependent on or determined based on at least one of (i) the patient image data 600, (ii) the planning data, (iii) the type of surgery selected by the user or indicated by the planning data (e.g., functional endoscopic sinus surgery (FESS), cochlea surgery, biopsy, etc.), and (iv) external information about a current operating room setup (e.g., from a spatial mapping or video images, for example acquired by the sensor 304).

The operating room setup information requirements may depend on tracking data, object and item properties and physical models of the patient's body, of objects and items, etc. The operating room setup information requirements are also indicated in FIG. 8 and may depend on one or more of a tracking system measurement area, tracking characteristics of tracking system components, a working area of components (e.g., a surgical instrument or at least one of the first object of interest, the at least one second object of interest and the item), a shape of the components, physically possible configurations, a disturbing component negatively affecting the tracking accuracy, etc. The operating room setup information requirements may be dependent on or determined based on at least one of (i) spatial mapping data, (ii) spatial understanding data, (iii) a webcam or depth-image, for example acquired by the sensor 304, (iv) marker-based and/or marker-less tracking of components (e.g., the object(s) or the item), (v) model information of components (e.g., as STL mesh data), (vi) geometric properties of the components, and (vii) tracking data from tracking system (e.g., the tracking system 400).

FIG. 8 also indicates that "allow areas" may be combined with a "tracking area". One may say that the requirements define a viewing area or an effective tracking area or volume of a tracker of the tracking system (e.g., a stereo-camera or an electromagnetic field generator). The requirements may also indicate a spatial requirement with respect to an entry point and a target size and pose. The position areas to be proposed ("Proposed Position Areas") may correspond to the primary, first, second, secondary, third and/or fourth spatial portions described above. Placement of the objects may influence the proposed areas ("Refine with set positions of other components"). Tracking data obtained from the tracking system may be used to determine an accurate spatial pose of one or more objects and to update the spatial portions accordingly. Objects should be placed such that they do not disturb the tracking quality ("Optimize tracking quality").

Based on the one or more requirements the method described herein may optimize a spatial relation between the navigation system 400 and involved components and recommend positioning areas weighted by their quality. During the placement of the components (e.g., the first object of interest and the at least one second object of interest) by the user, the recommended positioning areas (e.g., the first spatial portion and the third spatial portion(s)) may be dynamically refined.

The components to be arranged (e.g., the first object of interest and the at least one second object of interest) may comprise but are not limited to an operating room table, a navigation system, a cart, a mounting arm, a robot, an imaging device, a surgical tool or instrument, staff and working areas of staff.

Figure 9:
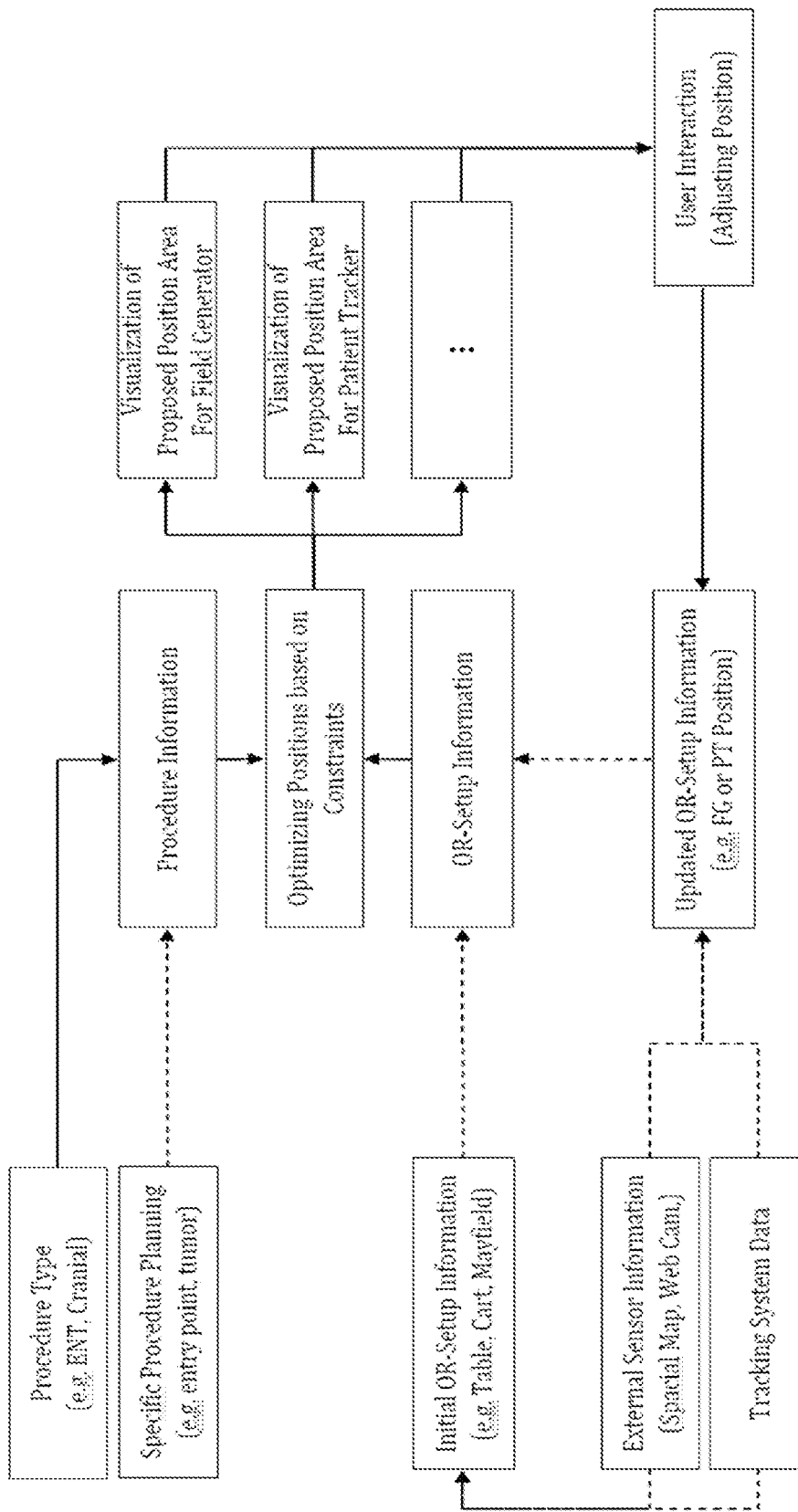
FIG. 9 schematically illustrates requirements and use thereof in accordance with the present disclosure.

FIG. 9 may be regarded as an exemplary and more detailed illustration of the method described above with reference to FIG. 2. The "Visualization of Proposed Position Area For Field Generator" in FIG. 9 may correspond to the first spatial portion described herein. The "Visualization of Proposed Position Area For Patient Tracker" may correspond to the third spatial portion described herein. The "User Interaction" may correspond to a placement of the first object of interest (e.g., the field generator 404) or the second object of interest (e.g., the sensor 406) or a movement thereof. That is, the visualization(s) may not only be updated upon placement of an object of interest, but also in response to a movement thereof.

The step "Optimizing Positions based on Constraints" shown in FIG. 9 may correspond to the similarly named step of FIG. 8. The "OR-Setup Information" of FIG. 9 may include the operating room setup information requirements (e.g., as described above with reference to FIG. 8). The "Procedure Information" of FIG. 9 may include the procedure information requirements (e.g., as described above with reference to FIG. 8). The combination of the "OR-Setup Information" and the "Procedure Information" may be considered to represent the first constraint data, the second constraint data and the third constraint data.

The resulting operating room setup proposals may represent a three-dimensional arrangement of the tracking system components relative to the patient (e.g. the patient's head in ENT surgery) or a setup component. This arrangement may either be displayed on a monitor of a navigation system (e.g., comprising the tracking system 400) or on the ARD 300 (e.g. Microsoft HoloLens®).

The ARD 300 (e.g., configured as head-mounted display, HMD) may visualize guidance information for an optimal operating room setup directly in the real world. This guidance may be based on a pre-registration of the patient, the field generator 404 and the patient tracker 406 with respect to the coordinate space 306 of the head-mounted display. This pre-registration may make use of trained models for face and object detection in a webcam image of the sensor 304 and a spatial mapping of the head-mounted display 300.

The proposed method does not necessarily utilize tracking data from a surgical navigation system. Thus, guidance may be provided independent to a current state of the surgical navigation system and can help to setup the navigation system itself (e.g., the tracking system 400).

If additional sensor input from the operating room setup is available, the proposed method may allow a holistic approach for the component placement.

In a potential application, the guidance visualization may be visualized on a head-mounted display. If the patient is tracked by the head-mounted display, the visualizations may be shown directly at their actual positions. In this case, the user may no longer required to mentally transfer information from abstract two-dimensional or three-dimensional visualizations.

Modifications of the method, the processing system, the surgical system and the computer program disclosed herein are possible. For example, the operating room setup information requirements may be indicated by at least one of the first constraint data, the second constraint data and the third constraint data. As another example, the procedure information requirements may be indicated by at least one of the first constraint data, the second constraint data and the third constraint data. Further technical effects and advantages will be apparent to those skilled in the art in view of the above.

The invention claimed is:

1. A computer-implemented method for providing guidance to a user on where to arrange an electromagnetic field generator and at least one electromagnetic sensor in an operating room, the method comprising:
   obtaining scene data indicative of a spatial pose of at least one item arranged within the operating room;
   obtaining first constraint data indicative of one or more requirements on a spatial relationship between the electromagnetic field generator and the at least one item arranged within the operating room;
   determining, based on the scene data and the first constraint data, at least one primary spatial portion chosen from (a) a first spatial portion in which the electromagnetic field generator is recommended to be arranged, the first spatial portion being larger than the electromagnetic field generator, and (b) a second spatial portion in which the electromagnetic field generator is not allowed to be arranged;

obtaining, for each of at least one electromagnetic sensor, second constraint data indicative of one or more requirements on a spatial relationship between the electromagnetic sensor and the electromagnetic field generator;

determining, for each of the at least one electromagnetic sensor, based on the determined primary spatial portion and the second constraint data, at least one secondary spatial portion chosen from (a) a third spatial portion in which the electromagnetic sensor is recommended to be arranged, and (b) a fourth spatial portion in which the electromagnetic sensor is not allowed to be arranged;

triggering display of a visualization of the at least one primary spatial portion to provide guidance to the user on where to arrange the electromagnetic field generator in the operating room; and triggering, for each of the at least one electromagnetic sensor, display of a visualization of the at least one secondary spatial portion to provide guidance to the user on where to arrange the at least one electromagnetic sensor in the operating room.

2. The method of claim 1, wherein the first spatial portion comprises at least two first sub-portions, each first sub-portion comprising at least one recommended position of the electromagnetic field generator, wherein each of the first sub-portions is associated with a different degree of recommendation, wherein the visualization of the first spatial portion comprises a distinguishable visualization of each first sub-portion.

3. The method of claim 1, further comprising triggering display of an instruction to arrange the electromagnetic field generator in the first spatial portion.

4. The method of claim 1, wherein at least one of the requirements fulfils at least one of the following requirements: (i) it is patient-specific; (ii) it is associated with a type of surgery selected by the user; and (iii) it is associated with a surgical procedure selected by the user.

5. The method of claim 1, wherein the at least one item comprises a part of a patient's body and wherein the electromagnetic field generator is a medical device.

6. The method of claim 1, wherein the visualization is triggered to be displayed overlaid onto a view of at least a part of the operating room.

7. The method of claim 1, wherein one of the visualization of the at least one primary spatial portion or the visualization of the at least one secondary spatial portion are configured to update based upon a changed condition including a movement of one of the electromagnetic field generator or the electromagnetic sensor, a change in relative pose between the electromagnetic field generator and the electromagnetic sensor, or a presence of a disturbing component.

8. The method of claim 1, wherein the visualization is triggered to be displayed on a display of a head-mounted display, HMD.

9. The method of claim 8, wherein the HMD comprises at least one sensor chosen from an optical sensor and a depth sensor, the method further comprising:

obtaining sensor data captured by the at least one sensor;

detecting, based on the sensor data, at least one component chosen from the electromagnetic field generator and the at least one item;

determining a spatial relationship between the detected at least one component and the HMD; and determining the visualization based on the spatial relationship between the detected at least one component and the HMD.

10. The method of claim 1, wherein, the third spatial portion is larger than the electromagnetic sensor.

11. The method of claim 10, wherein the third spatial portion comprises at least two third sub-portions, each third sub-portion comprising at least one recommended position of the electromagnetic sensor, wherein each of the third sub-portions is associated with a different degree of recommendation, wherein the visualization of the third spatial portion comprises a distinguishable visualization of each third sub-portion.

12. The method of claim 10, further comprising:

obtaining first alignment data indicative of the spatial relationship between the electromagnetic field generator arranged in the operating room and the at least one item;

determining, for each of the at least one electromagnetic sensor, an updated instance of the at least one secondary spatial portion based on the second constraint data and the first alignment data; and updating, for each of the at least one electromagnetic sensor, the display of the visualization of the at least one secondary spatial portion based on the updated instance of the at least one secondary spatial portion.

13. The method of claim 12, wherein the updated instance of the at least one secondary spatial portion is determined responsive to the first alignment data indicating that the electromagnetic field generator is arranged within the first spatial portion.

14. The method of claim 12, further comprising:

responsive to the first alignment data indicating that the electromagnetic field generator is arranged within the first spatial portion, triggering display of an instruction to arrange one or more of the at least one electromagnetic sensor in the third spatial portion determined for the one or more of the at least one electromagnetic sensor.

15. The method of claim 12, further comprising:

obtaining second alignment data indicative of a spatial relationship between the at least one primary spatial portion and one or more of the at least one electromagnetic sensor arranged in the operating room;

determining an updated instance of the at least one primary spatial portion based on the second constraint data and the second alignment data; and updating the display of the visualization of the at least one primary spatial portion based on the updated instance of the at least one primary spatial portion.

16. The method of claim 15, wherein the updated instance of the at least one primary spatial portion is determined responsive to the second alignment data indicating that the one or more of the at least one electromagnetic sensor are arranged within the third spatial portion determined for the one or more of the at least one electromagnetic sensor.

17. The method of claim 15, further comprising:

obtaining, for one of the at least one electromagnetic sensor, third constraint data indicative of one or more requirements on a spatial relationship between the one of the at least one electromagnetic sensor and another one or more of the at least one electromagnetic sensor, wherein the at least one secondary spatial portion of the one of the at least one electromagnetic sensor is determined further based on the third constraint data.

18. The method of claim 17, further comprising:
obtaining third alignment data indicative of a spatial relationship between (i) the at least one secondary spatial portion of the one of the at least one electromagnetic sensor and (ii) the another one or more of the at least one electromagnetic sensor arranged in the operating room;
determining, based on the third constraint data and the third alignment data, an updated instance of the at least one secondary spatial portion of the one of the at least one electromagnetic sensor; and
updating, based on the updated instance of the at least one secondary spatial portion, the display of the visualization of the at least one secondary spatial portion of the one of the at least one electromagnetic sensor.

19. A surgical system comprising:
an electromagnetic generator;
at least one electromagnetic sensor;
at least one controller configured to:
obtain scene data indicative of a spatial pose of at least one item arranged within an operating room;
obtain first constraint data indicative of one or more requirements on a spatial relationship between the electromagnetic field generator and the at least one item arranged within the operating room;
determine, based on the scene data and the first constraint data, at least one primary spatial portion chosen from (a) a first spatial portion in which the electromagnetic field generator is recommended to be arranged, the first spatial portion being larger than the electromagnetic field generator, and (b) a second spatial portion in which the electromagnetic field generator is not allowed to be arranged;
obtain, for each of the at least one electromagnetic sensor, second constraint data indicative of one or more requirements on a spatial relationship between the electromagnetic sensor and the electromagnetic field generator;
determine, for each of the at least one electromagnetic sensor, based on the determined primary spatial portion and the second constraint data, at least one secondary spatial portion chosen from (a) a third spatial portion in which the electromagnetic sensor is recommended to be arranged, and (b) a fourth spatial portion in which the electromagnetic sensor is not allowed to be arranged;
trigger display of a visualization of the at least one primary spatial portion to provide guidance to a user on where to arrange the electromagnetic field generator in the operating room; and
trigger, for each of the at least one electromagnetic sensor, display of a visualization of the at least one secondary spatial portion to provide guidance to the user on where to arrange the at least one electromagnetic sensor in the operating room.

20. The surgical system of claim 19, further comprising:
a head-mounted display, HMD, the HMD comprising at least one sensor chosen from an optical sensor and a depth sensor, wherein the at least one sensor is configured to capture sensor data enabling detection of at least one component chosen from the electromagnetic field generator and the at least one item.

21. A computer-readable storage medium carrying a computer program comprising instructions which, when the program is executed by at least one processor, cause the at least one processor to:
obtain scene data indicative of a spatial pose of at least one item arranged within an operating room;
obtain first constraint data indicative of one or more requirements on a spatial relationship between an electromagnetic field generator and the at least one item arranged within the operating room;
determine, based on the scene data and the first constraint data, at least one primary spatial portion chosen from (a) a first spatial portion in which the electromagnetic field generator is recommended to be arranged, the first spatial portion being larger than the electromagnetic field generator, and (b) a second spatial portion in which the electromagnetic field generator is not allowed to be arranged;
obtain, for each of at least one electromagnetic sensor, second constraint data indicative of one or more requirements on a spatial relationship between the electromagnetic sensor and the electromagnetic field generator;
determine, for each of the at least one electromagnetic sensor, based on the determined primary spatial portion and the second constraint data, at least one secondary spatial portion chosen from (a) a third spatial portion in which the electromagnetic sensor is recommended to be arranged, and (b) a fourth spatial portion in which the electromagnetic sensor is not allowed to be arranged;
trigger display of a visualization of the at least one primary spatial portion to provide guidance to a user on where to arrange the electromagnetic field generator in the operating room; and
trigger, for each of the at least one electromagnetic sensor, display of a visualization of the at least one secondary spatial portion to provide guidance to the user on where to arrange the at least one electromagnetic sensor in the operating room.

22. A computer-implemented method for providing guidance to a user on where to arrange an object of interest in an operating room, the method comprising:
obtaining scene data indicative of a spatial pose of at least one item arranged within the operating room;
obtaining first constraint data indicative of one or more requirements on a spatial relationship between a first object of interest and the at least one item arranged within the operating room;
determining, based on the scene data and the first constraint data, at least one primary spatial portion chosen from (a) a first spatial portion in which the first object of interest is recommended to be arranged, the first spatial portion being larger than the first object of interest, and (b) a second spatial portion in which the first object of interest is not allowed to be arranged;
obtaining, for each of at least one second object of interest, second constraint data indicative of one or more requirements on a spatial relationship between the second object of interest and the first object of interest;
determining, for each of the at least one second object of interest, based on the determined primary spatial portion and the second constraint data, at least one secondary spatial portion chosen from (a) a third spatial portion in which the second object of interest is recommended to be arranged, and (b) a fourth spatial portion in which the second object of interest is not allowed to be arranged;

triggering display of a visualization of the at least one primary spatial portion to provide guidance to the user on where to arrange the first object of interest in the operating room;

triggering, for each of the at least one second object of interest, display of a visualization of the at least one secondary spatial portion to provide guidance to the user on where to arrange the at least one second object of interest in the operating room;

after the first object of interest has been arranged in the operating room, obtaining first alignment data indicative of the spatial relationship between the first object of interest and the at least one item;

only in response to the first alignment data being obtained, determining, for each of the at least one second object of interest, an updated instance of the at least one secondary spatial portion based on the second constraint data and the first alignment data; and updating, for each of the at least one second object of interest, the display of the visualization of the at least one secondary spatial portion based on the updated instance of the at least one secondary spatial portion.

23. The method of claim 22, wherein the first object of interest is an electromagnetic field generator, and wherein the second object of interest is a patient tracker.

24. The method of claim 22, wherein the first object of interest is a patient tracker, wherein a first one of the at least one second object of interest is a surgical instrument configured as a biopsy guide, and wherein a second one of the at least one second object of interest is a tracking system device including an electromagnetic field generator or a stereo camera.

25. The method of claim 22, wherein the first object of interest is a surgical instrument configured as a biopsy guide; and
   wherein a first one of the at least one second object of interest is a patient tracker; and
   wherein a second one of the at least one second object of interest is a tracking system device including an electromagnetic field generator or a stereo camera.

26. The method of claim 22, wherein the first object of interest is a tracking system device including an electromagnetic field generator or a stereo camera; and
   wherein a first one of the at least one second object of interest is a patient tracker; and
   wherein a second one of the at least one second object of interest is a surgical instrument configured as a biopsy guide.

27. The method of claim 22, wherein the at least one item includes an operating table;
   wherein the first object of interest is a body of a patient;
   wherein a first one of the at least one second object of interest is an electromagnetic field generator; and
   wherein a second one of the at least one second object of interest is a patient tracker.

* * * * *